(12) United States Patent
Taguchi

(10) Patent No.: US 10,895,268 B2
(45) Date of Patent: Jan. 19, 2021

(54) VARIABLE STATOR VANE STRUCTURE OF AXIAL COMPRESSOR

(71) Applicant: HONDA MOTOR CO., LTD., Tokyo (JP)

(72) Inventor: Shu Taguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 211 days.

(21) Appl. No.: 16/355,990

(22) Filed: Mar. 18, 2019

(65) Prior Publication Data

US 2020/0063755 A1 Feb. 27, 2020

(30) Foreign Application Priority Data

Mar. 20, 2018 (JP) .................. 2018-052427

(51) Int. Cl.
*F04D 29/38* (2006.01)
*F04D 29/54* (2006.01)

(52) U.S. Cl.
CPC .......... *F04D 29/542* (2013.01); *F04D 29/38* (2013.01)

(58) Field of Classification Search
None
See application file for complete search history.

(56) References Cited

U.S. PATENT DOCUMENTS

| | | | | |
|---|---|---|---|---|
| 2,527,971 A * | 10/1950 | Stalker | .................. | F04D 19/028 415/115 |
| 2,702,157 A * | 2/1955 | Stalker | ................ | F04D 27/0215 415/48 |
| 2,785,849 A * | 3/1957 | Stalker | .................. | F04D 19/028 415/192 |
| 2,806,645 A * | 9/1957 | Stalker | .................. | F04D 29/544 415/210.1 |
| 3,883,264 A * | 5/1975 | Rao | .......................... | F01D 1/04 415/119 |
| 5,044,879 A * | 9/1991 | Farrar | .................. | F01D 17/162 415/150 |
| 5,182,855 A * | 2/1993 | Martin | .................. | B23P 15/006 269/296 |
| 5,623,823 A * | 4/1997 | Schirle | ...................... | F02K 3/06 60/226.3 |
| 9,957,806 B2 * | 5/2018 | Johann | .................... | B22F 3/225 |
| 2004/0197187 A1 * | 10/2004 | Usab, Jr. | .................. | F01D 5/142 415/1 |
| 2006/0275111 A1 * | 12/2006 | Orlando | .................. | F01D 5/141 415/191 |

(Continued)

FOREIGN PATENT DOCUMENTS

| JP | H11-200808 | 7/1999 |
|---|---|---|
| JP | 2007-100700 | 4/2007 |

*Primary Examiner* — Michael Lebentritt
(74) *Attorney, Agent, or Firm* — Rankin, Hill & Clark LLP

(57) ABSTRACT

In an axial compressor including a row of rotor blades (70) provided on a rotational shaft (20) around a central axial line of the rotational shaft at a prescribed pitch, and a row of stator vanes (40) provided on a casing around the central axial line at a prescribed pitch so as to adjoin the row of rotor blades on an upstream or downstream side thereof, the rotor blades each extend along a radial line (R) emanating from the central axial line, and the stator vanes each extend along a slanted line (I) that is slanted with respect to a corresponding radial line in a circumferential direction.

2 Claims, 7 Drawing Sheets

(56) References Cited

U.S. PATENT DOCUMENTS

| | | | |
|---|---|---|---|
| 2009/0252596 A1* | 10/2009 | Guemmer | F02C 3/30 |
| | | | 415/115 |
| 2010/0303629 A1* | 12/2010 | Guemmer | F01D 5/146 |
| | | | 416/223 R |
| 2012/0121394 A1* | 5/2012 | Iida | F01D 5/225 |
| | | | 415/173.1 |
| 2014/0255188 A1* | 9/2014 | Fulayter | F01D 17/162 |
| | | | 416/1 |
| 2016/0069275 A1* | 3/2016 | Lecordix | F01D 17/162 |
| | | | 415/1 |
| 2016/0130960 A1* | 5/2016 | Cortequisse | F01D 5/02 |
| | | | 415/173.4 |
| 2017/0356298 A1* | 12/2017 | Carty | F01D 25/246 |
| 2018/0003193 A1* | 1/2018 | Bazot | F04D 29/644 |
| 2020/0080432 A1* | 3/2020 | Filipenco | F02C 9/20 |

* cited by examiner

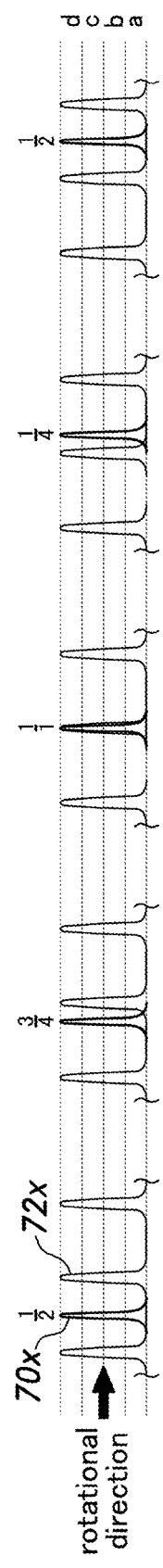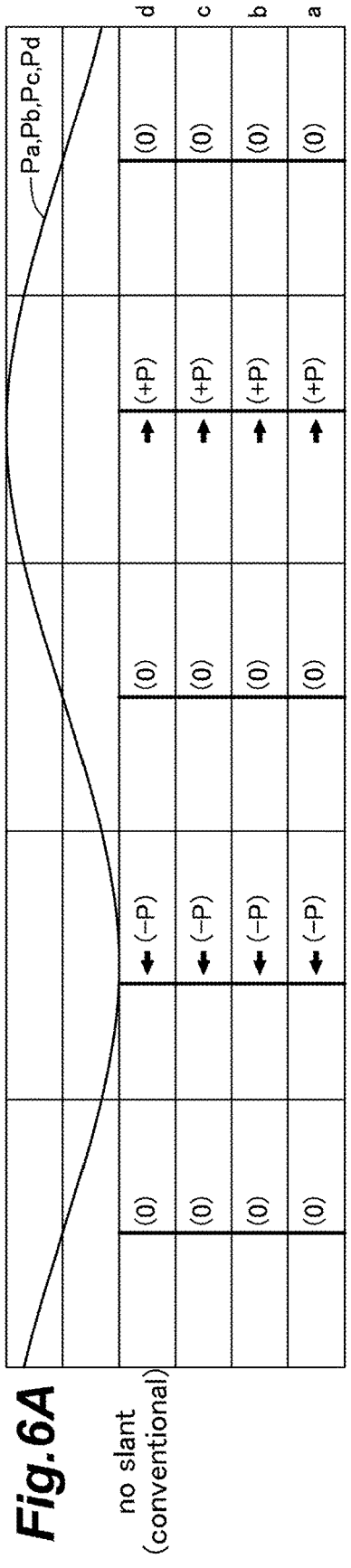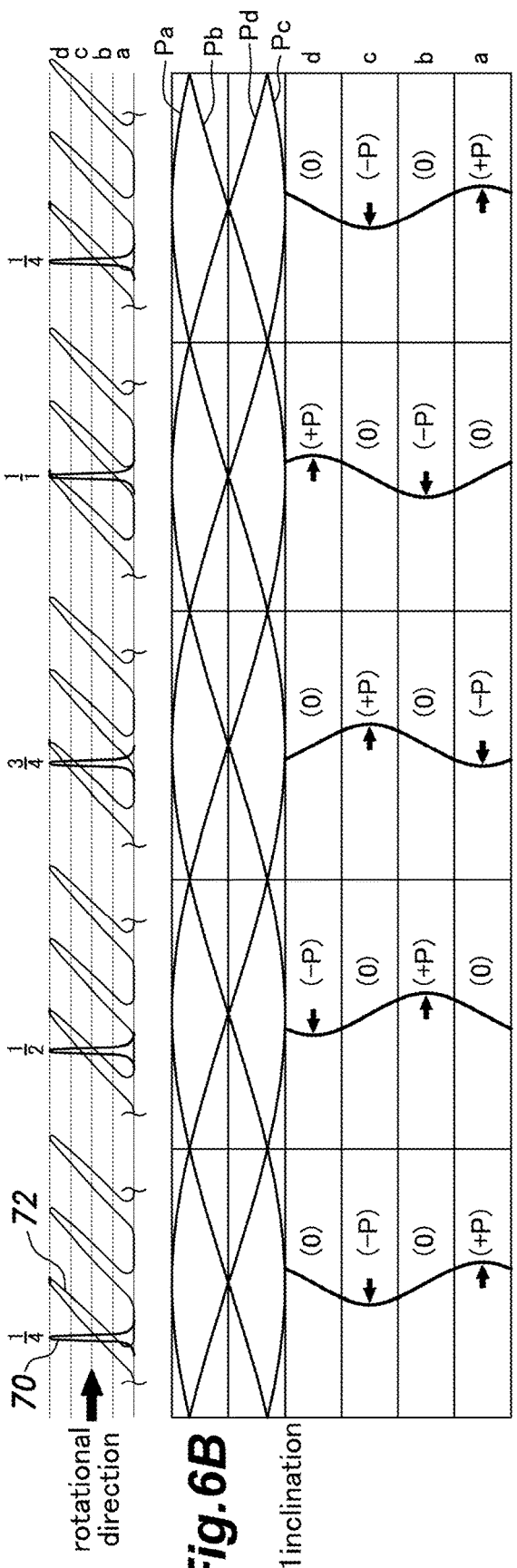
Fig.6A  no slant (conventional)
Fig.6B  1/1 inclination

VARIABLE STATOR VANE STRUCTURE OF AXIAL COMPRESSOR

TECHNICAL FIELD

The present invention relates to an axial compressor suitable for use, not exclusively, in gas turbine engines for aircraft or the like, and in particular, to an axial compressor having a plurality of novel stator vanes.

BACKGROUND ART

A known axial compressor for use in a gas turbine or the like includes a casing, a rotational shaft rotatably provided in the casing, a plurality of rows of rotor blades provided on the rotational shaft at a prescribed pitch around the central axial line of the rotational shaft, and a plurality of rows of stator vanes provided on the casing at a prescribed pitch around the central axial line so as to alternate with the rotor blade rows. See JPH11-200808A and JP2007-100700, for instance.

In such conventional axial compressors, the rotor blades and the stator vanes extend radially with respect to the axial center line of the rotational shaft. Therefore, as the rotor blades rotate, the rotor blades cyclically overlap with the stator blades (as seen in the axial direction) substantially entirely at certain angular positions of the rotational shaft, and do not overlap with the stator blades (as seen in the axial direction) at other angular positions. Therefore, a pressure distribution acting on each rotor blade along the length of the rotor blade (along the radial direction) is substantially uniform, and cyclically changes in magnitude as the rotational shaft rotates. The same is true with the stator vanes. This cyclic change in the pressure acting on each rotor blade or each stator vane inevitably induces vibrations in various vibrations modes to the rotor blade or the stator vane. Such vibrations are known to be harmful for the durability of the rotor blades and the stator vanes.

Also, because of such an arrangement of the rotor blades and the stator vanes, a wake is generated downstream of each stator vane and a potential flow is generated in an upstream part of each stator vane so that a significant fluctuation of pressure develops in the circumferential direction. This in turn causes an uneven distribution of the flow of air (working fluid) along the circumferential direction. As the rotor blades rotates across such uneven air flow existing upstream or downstream of each stator vane row, the rotor blades inevitably receive an excitation force that causes the vibration of the rotator blades. This is known as rotor-stator interaction, and is particularly the case when the rotor blades cyclically overlap with the stator blades substantially entirely at certain angular positions of the rotational shaft, and do not overlap with the stator blades at other angular positions because the excitation force acts upon each rotor blade or stator vane over the entire length thereof at the same time. Such vibrations are known to be harmful for the durability of the rotor blades and the stator vanes.

SUMMARY OF THE INVENTION

In view of such a problem of the prior art, a primary object of the present invention is to provide an axial compressor that can effectively suppress vibrations of rotor blades and stator vanes thereof.

To achieve such an object, one embodiment of the present invention provides an axial compressor, comprising: a casing (14); a rotational shaft (20) rotatably provided in the casing (14); a row of rotor blades (70) provided on the rotational shaft (20) around a central axial line of the rotational shaft at a prescribed pitch; and a row of stator vanes (40) provided on the casing around the central axial line at a prescribed pitch so as to adjoin the row of rotor blades on an upstream or downstream side thereof, wherein the rotor blades each extend along a radial line (R) emanating from the central axial line, and the stator vanes each extend along a slanted line (I) that is inclined with respect to a corresponding radial line in a circumferential direction.

Owing to this arrangement, the excitation force acts on each rotor blade or stator vane with a certain time delay along the entire length thereof, instead of acting on the entire length of the rotor blade or the stator vane at the same time. Therefore, the excitation force is prevented from developing resonance vibrations or specific modes of vibrations in the rotor blade or the stator vane. Therefore, the durability of the rotor blades and the stator vanes is improved. The stator vanes may be inclined in either circumferential direction. In other words, the radially inner end of each stator vane may be offset circumferentially in either advancing or receding direction of the rotor blades.

In this axial compressor, preferably, a radially outer end of each stator vane is circumferentially offset from a radially inner end of the stator vane by ½ or more of the pitch of the stator vanes.

Thereby, a phase difference is created between the excitation force acting on the radially inner end and the radially outer end of each stator vane so that at least some of the excitation force acting on the stator vane cancels out over the entire length of the stator vane, and this reduces the effectiveness of the excitation force in inducing any specific vibration modes, in particular low-order vibration modes.

More preferably, a radially outer end of each stator vane is circumferentially offset from a radially inner end of the stator vane by the pitch of the stator vanes.

Thereby, the excitation force acting on each stator vane is most effectively canceled out over the entire length of the stator vane so that any specific vibration modes are prevented from being developed.

In this axial compressor, preferably, a plurality of rows of stator vanes and a plurality of rows of rotor blades are alternately provided in an axial direction.

The present invention can be favorably applied to multi-stage axial compressors.

According to the axial compressor of the present invention, vibrations of the rotor blades and stator vanes in operation can be favorably controlled so that the durability of the rotor blades and the stator vanes can be improved.

BRIEF DESCRIPTION OF THE DRAWINGS

FIG. 6A is a graph showing a pressure property of a conventional axial compressor;

FIG. 6B is a graph showing a pressure property of the axial compressor according to the embodiment of the present invention.

DESCRIPTION OF THE PREFERRED EMBODIMENT(S)

Preferred embodiments of the present invention are described in the following with reference to the appended drawings.

Figure 1:
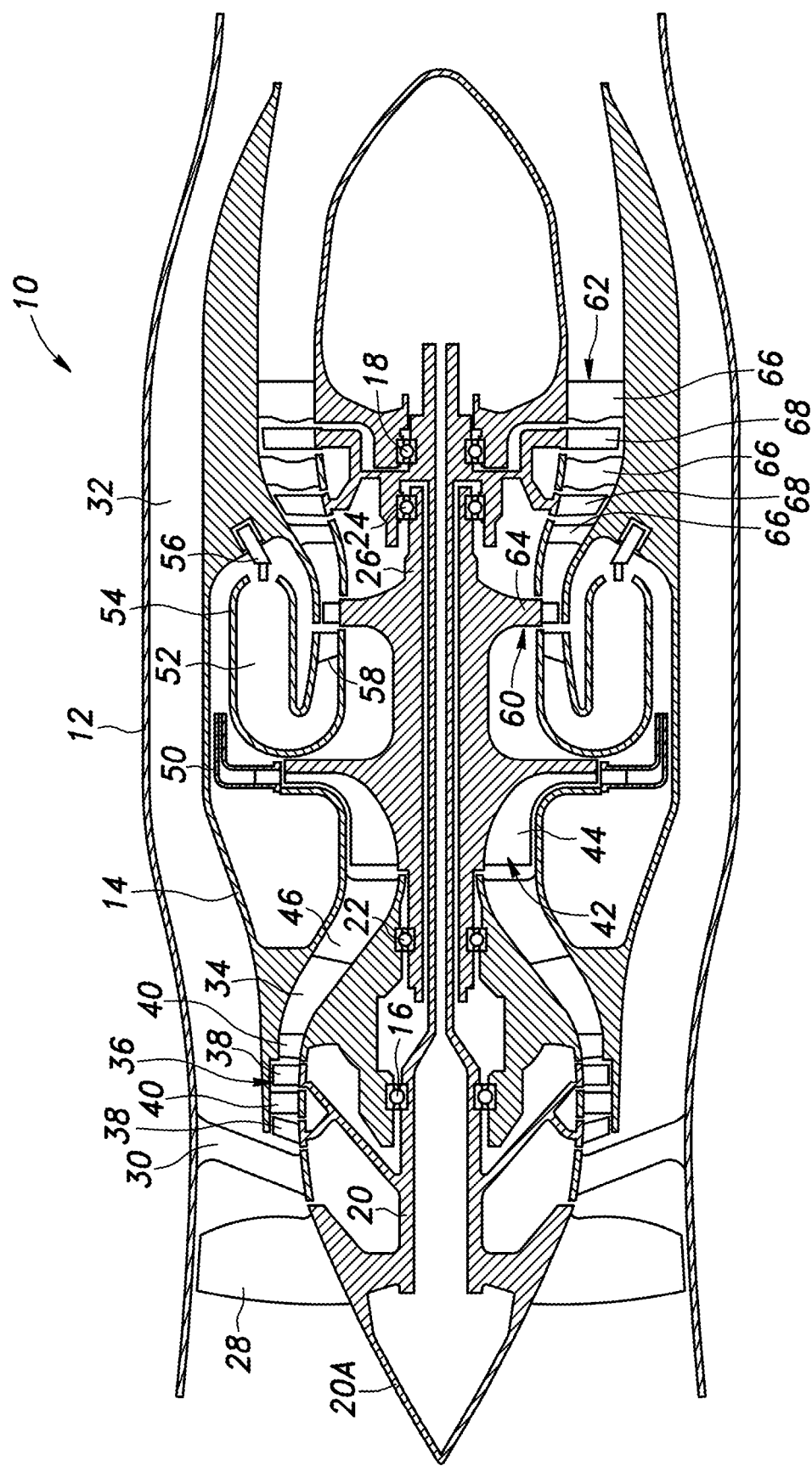
FIG. 1 is a sectional view showing an outline of a gas turbine engine for aircraft employing an axial compressor according to an embodiment of the present invention.

FIG. 1 shows an outline of a gas turbine engine (turbofan engine) for aircraft using an axial compressor including a variable stator vane structure according to an embodiment of the present invention.

The gas turbine engine 10 is provided with an outer casing 12 and an inner casing 14 which are substantially cylindrical in shape, and are coaxially arranged relative to each other. The inner casing 14 rotatably supports a low pressure rotational shaft 20 via a front first bearing 16 and a rear first bearing 18 fitted on the outer periphery of the low pressure rotational shaft 20. The inner casing 14 also rotatably supports a high pressure rotational shaft 26 consisting of a hollow shaft coaxially receiving the low pressure rotational shaft 20 therein via a front second bearing 22 and a rear second bearing 24 fitted on the outer periphery of the high pressure rotational shaft 26. The common central axial line of the low pressure rotational shaft 20 and the high pressure rotational shaft 26 is indicated by letter A.

The low pressure rotational shaft 20 includes a substantially conical front end portion 20A projecting axially forward from the inner casing 14, and surrounded by a front end part of the outer casing 12. A front fan 28 is provided on the outer periphery of the front end portion 20A. A plurality of stator vanes 30 each having an outer end joined to the outer casing 12 and an inner end joined to the inner casing 14 are provided on the downstream side of the front fan 28 at a regular interval in the circumferential direction. On the downstream side of the stator vane 30, a bypass duct 32 having an annular cross sectional shape is defined between the outer casing 12 and the inner casing 14, and an air compression duct (annular fluid passage) 34 having an annular cross sectional shape is defined inside the inner casing 14 in a coaxial relationship (concentric with the central axial line).

An axial compressor 36 is provided in an inlet part of the air compression duct 34. The axial compressor 36 is provided with two rows of rotor blades 38 extending radially outward from the front end portion 20A of the low pressure rotational shaft 20, and two rows of stator vanes 40 extending radially inward from the inner casing 14 in such a manner that the rows of the stator vanes 40 and the rows of the rotor blades 38 are arranged axially in close proximity and in an alternating manner.

A centrifugal compressor 42 is provided in an outlet part of the air compression duct 34. The centrifugal compressor 42 is provided with an impeller 44 fixedly attached to the outer periphery of the high pressure rotational shaft 26. An additional row of stator vanes 46 are provided downstream of the axial compressor 36 and upstream of the centrifugal compressor 42. A diffuser 50 fixedly attached to the inner casing 14 is provided immediately downstream of the centrifugal compressor 42.

A plurality of reverse-flow combustors 52 are formed on the downstream side of the diffuser 50 to receive compressed air from the diffuser 50. The inner casing 14 is provided with a plurality of fuel injectors 56 for injecting fuel into the reverse-flow combustors 52. The reverse-flow combustors 52 generate high pressure combustion gas by the combustion of the mixture of the fuel and the air. A row of nozzle guide vanes 58 are provided downstream of the reverse-flow combustors 52.

Downstream to the nozzle guide vanes 58 are provided a high pressure turbine 60 and a low pressure turbine 62 in that order. The combustion gas generated by the reverse-flow combustors 52 is forwarded to the high pressure turbine 60 and the low pressure turbine 62. The high pressure turbine 60 includes a high pressure turbine wheel 64 fixed to the outer periphery of the high pressure rotational shaft 26 immediately downstream of the nozzle guide vanes 58. The low pressure turbine 62 includes a plurality of rows of nozzle guide vanes 66 fixedly attached to the inner casing 14 and a plurality of low pressure turbine wheels 68 fixedly attached to the outer periphery of the low pressure rotational shaft 20 so as to alternate with the rows of the nozzle guide vanes 66.

The gas turbine engine 10 is provided with a starter motor (not shown in the drawings) for starting the engine by rotatively driving the high pressure rotational shaft 26. When the high pressure rotational shaft 26 is rotatively driven, the intake air is compressed by the centrifugal compressor 42, and is forwarded to the reverse-flow combustors 52. The fuel injected from the fuel injectors 56 is mixed with the compressed intake air, and combusted in the reverse-flow combustors 52. The produced combustion gas is forwarded to the high pressure turbine wheel 64 and the low pressure turbine wheels 68 to rotatively drive the high pressure and low pressure turbine wheels 64 and 68.

As a result, the low pressure rotational shaft 20 and the high pressure rotational shaft 26 are rotatively driven so as to cause the front fan 19 to be rotated, and the axial compressor 36 and the centrifugal compressor 42 to be operated so that the compressed air is supplied to the reverse-flow combustors 52. Once this cycle is established, the gas turbine engine 10 continues operation even after the starter motor is stopped.

During the operation of the gas turbine engine 10, a part of the air drawn by the front fan 28 passes through the bypass duct 32 and is ejected rearward to create a thrust primarily during low speed flight. The remaining part of the air drawn by the front fan 28 is supplied to the reverse-flow combustors 52, and mixed with the fuel to combust the fuel. The resulting combustion gas rotatively drive the low pressure rotational shaft 20 and the high pressure rotational shaft 26, and is ejected rearward to create a thrust.

The details of the axial compressor 36 will be described in the following with reference to FIGS. 2 to 4.

Figure 2:
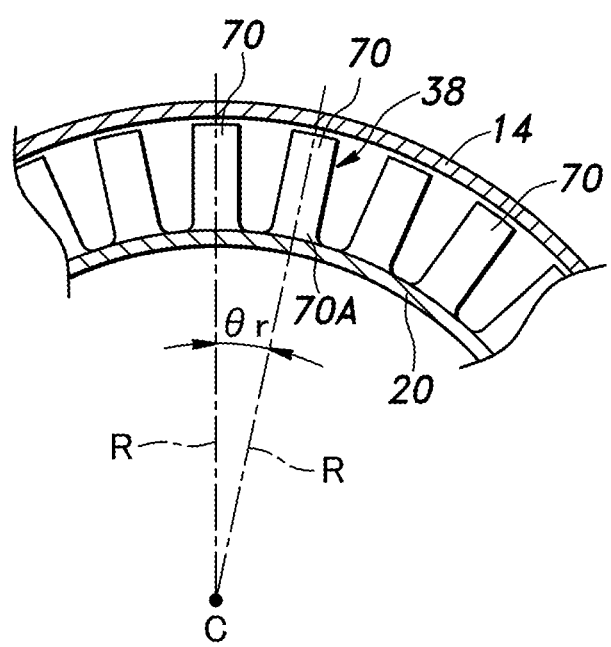
FIG. 2 is a fragmentary front view of rotor blades of the axial compressor.
Figure 3:
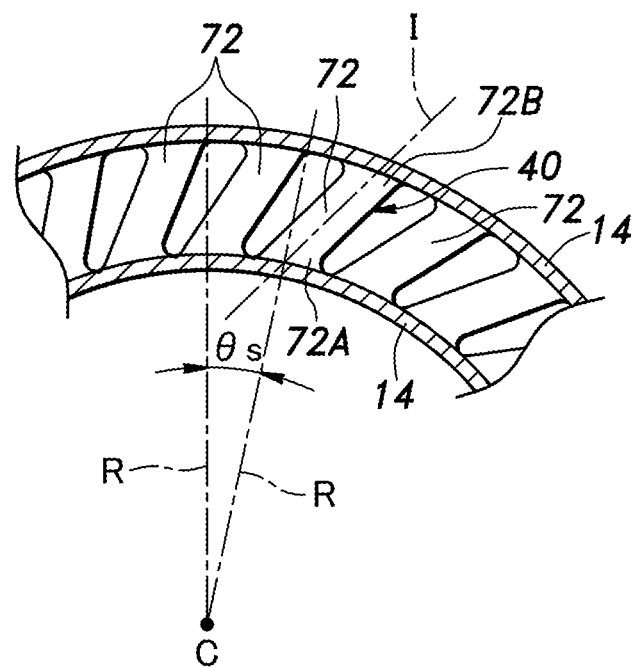
FIG. 3 is a fragmentary front view of stator vanes of the axial compressor.
Figure 4:
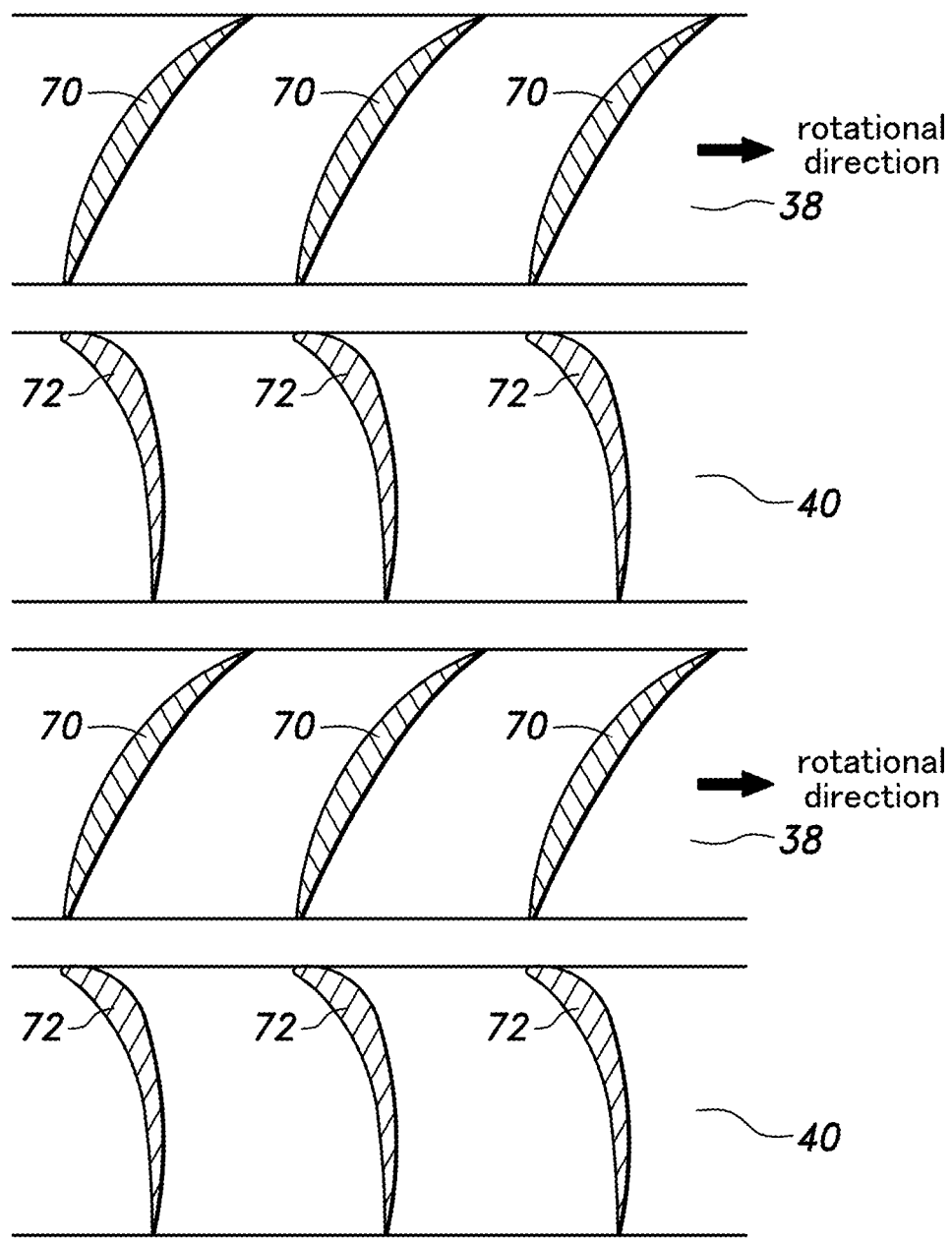
FIG. 4 is a fragmentary section view of stator vane rows and rotor blade rows of the axial compressor.

As shown in FIGS. 2 and 4, the rotor blades 70 are arranged in a plurality of rows each centered around the central axial line of the low pressure rotational shaft 20. Each rotor blade 70 consists of an aerofoil, and has a certain pitch angle $\theta r$ around the central axial line thereof. Each rotor blade 70 is fixedly attached to the low pressure rotational shaft 20 at the inner end (base end) thereof, and extends radially along a radial line R emanating from the central axial line (C) of the low pressure rotational shaft 20.

The stator vanes 72 are also arranged in a plurality of rows so as to alternate with the rows of the stator vanes 72 in the axial direction, and the rows of the stator vanes 72 are each centered around the central axial line of the low pressure rotational shaft 20. Each stator vane 72 consists of an aerofoil, and has a certain pitch angle $\theta s$ around the central axial line thereof. Each stator vane 72 is fixedly attached to the inner casing 14 at the inner end 72A and the outer end 72B thereof, and extends along a slanted line I which is slanted circumferentially with respect to the radial line R emanating from the central axial line (C) of the low pressure rotational shaft 20.

In the illustrated embodiment, the circumferential inclination of each stator vane 72 is such that the outer end 72B is angularly or circumferentially offset from the inner end 72A by a distance (angle) corresponding to the (angular) interval between the two adjoining stator vanes 72. This inclination angle may be referred to as $1/1$ inclination.

Figure 5:
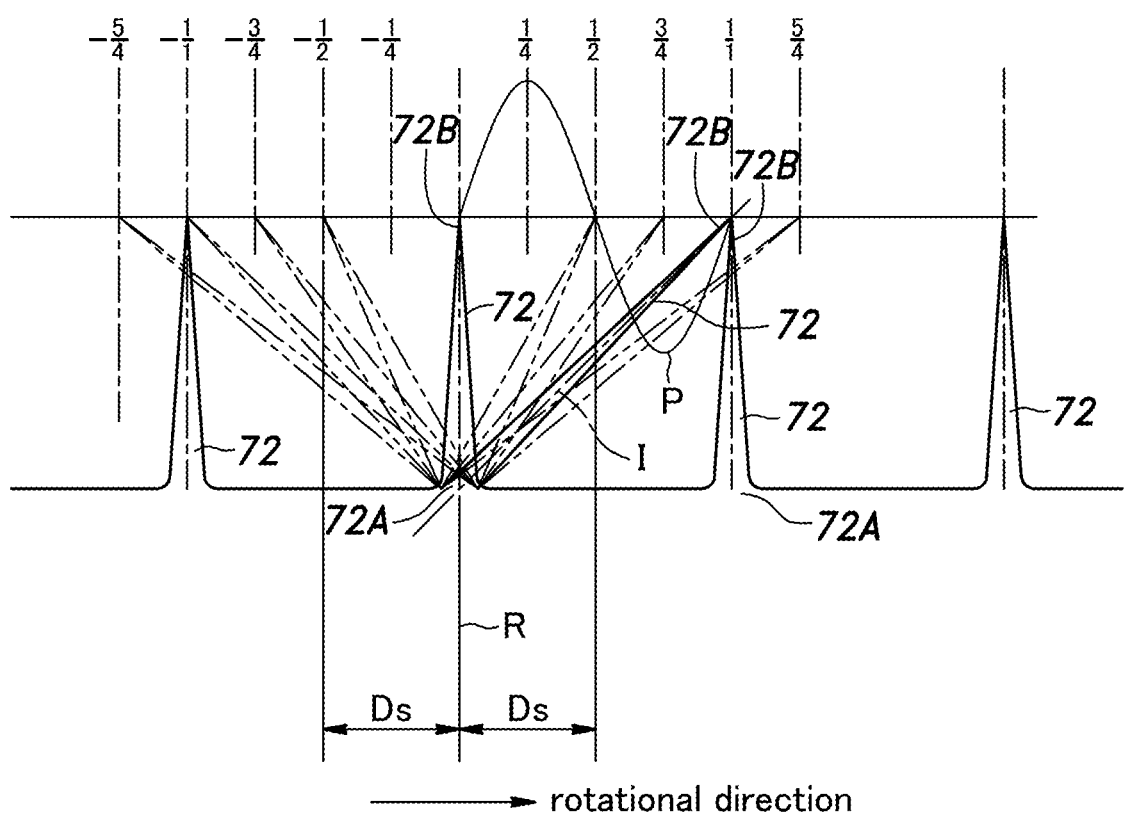
FIG. 5 is a diagram showing a stator vane at various slanting angles.

In FIG. 5, the curve denoted by letter P indicates the pressure distribution in the circumferential direction in the case where the rotor blades 70 and the stator vanes 72 both extend radially along corresponding radial lines emanating from the central axial line of the low pressure rotational shaft 20. It is shown that the pressure changes cyclically and sinusoidally in the circumferential direction for each interval between adjoining rotor blades 70.

According to this arrangement, since each stator vane 72 is inclined in the circumferential direction with respect to the rotating rotor blades 70, the excitation force generated by the rotor blades 70 as a pressure fluctuation acts upon the stator vane 72 sequentially along the length of the stator vane 72, instead of acting on the entire length of the stator vane 72 at the same time. Each rotor blade 70 is also subjected to a similar excitation force as a reaction. As a result, definite vibration modes, in particular low-order vibrations modes are prevented from developing the rotor blades 70 and the stator vanes 72 so that the durability of the rotor blades 70 and the stator vanes 72 can be improved.

The state of the pressure distribution acting on the rotor blades 70 and the stator vanes 72 due to the rotation of the rotor blades 70 will be described in the following with reference to FIGS. 6A and 6B. FIG. 6A shows the state of the pressure distribution in a conventional arrangement where the rotor blades 70x and the stator vanes 72x are both arranged on the radial lines emanating radially from the central axial line of the low pressure rotational shaft 20. FIG. 6B shows the pressure distribution in the present embodiment where the stator vanes 40 extend along slanted lines I which are circumferentially inclined (with $1/1$ inclination) with respect to the corresponding radial lines emanating from the central axial line of the low pressure rotational shaft 20.

In FIG. 6A, $1/1$ represents the rotational phase at which the rotor blade 70x and the stator vane 72x overlap with each other when viewed in the axial direction. $1/4$, $1/2$ and $3/4$ represent the rotational phase differences between the rotor blade 70x and the stator vane 72x by the corresponding fractions of one pitch or interval. In FIG. 6B, $1/1$ represents the rotational phase at which the inner end 70A of the rotor blade 70 and the inner end 72A of the stator vane 72 overlap with each other when viewed in the axial direction, and $1/4$, $1/2$ and $3/4$ represent the rotational phase differences between the inner end 70A of the rotor blade 70 and the inner end 72A of the stator vane 72 by the corresponding fractions of one pitch or interval.

In FIGS. 6A and 6B, Pa, Pb, Pc and Pd indicate the pressure of the working fluid acting on four regions a, b, c and d of the rotor blade 70 or 70x, or the stator vane 72 or 72x, respectively, as the rotor blade 70 or 70x rotates, the four regions being defined by dividing the rotor blade 70 or 70x, or the stator vane 72 or 72x in four equal parts along the length thereof.

In the conventional example shown in FIG. 6A, the working fluid pressures Pa, Pb, Pc, and Pd acting on the respective regions a, b, c, and d are equal to one another at all times. In the phase range where the rotational phase changes from $1/2$ to $1/1$, the working fluid pressure (−P) acts upon the entire length of the rotor blade 70x or the stator vane 72x simultaneously in the rightward direction in FIG. 6A. The pressure reaches a maximum value in absolute value when the rotational phase is $3/4$. In the phase range where the rotational phase changes from $1/1$ to $1/2$, the working fluid pressure (+P) acts upon the entire length of the rotor blade 70x or the stator vane 72x simultaneously in the leftward direction in FIG. 6A. The pressure reaches a maximum value when the rotational phase is $1/4$.

Thus, in the conventional example, the fluctuation of the pressure acting on the rotor blades 70x or the stator vane 72x is simultaneous over the entire length thereof, and is therefore likely to cause vibrations of the rotor blades 70x or the stator vane 72x.

On the other hand, in the present embodiment, since the stator vane 72 is inclined in the circumferential direction with respect to the rotor blade 70, the fluid pressures Pa, Pb, Pc and Pd act on the respective regions a, b, c and d in a sequential manner, instead of acting on the four regions simultaneously.

More specifically, in the present embodiment, when the rotational phase is $1/4$, the working fluid pressure +P acts on the region a of the rotor blade 70 or the stator vane 72, the working fluid pressure −P acts on the region c of the rotor blade 70 or the stator vane 72, and the working fluid pressure 0 (zero) acts on the regions b and d of the rotor blade 70 or the stator vane 72. When the rotational phase is $1/2$, the working fluid pressure +P acts on the region b of the rotor blade 70 or the stator vane 72, the working fluid pressure −P acts on the region d of the rotor blade 70 or the stator vane 72, and the working fluid pressure 0 (zero) acts on the regions a and c of the rotor blade 70 or the stator vane 72.

When the rotational phase is $3/4$, the working fluid pressure +P acts on the region c of the rotor blade 70 or the stator vane 72, the working fluid pressure −P acts on the region a of the rotor blade 70 or the stator vane 72, and the working fluid pressure 0 (zero) acts on the regions b and d of the rotor blade 70 or the stator vane 72. When the rotational phase is $1/1$, the working fluid pressure +P acts on the region d of the rotor blade 70 or the stator vane 72, the working fluid pressure −P acts on the region b of the rotor blade 70 or the stator vane 72, and the working fluid pressure 0 (zero) acts on the regions a and c of the rotor blade 70 or the stator vane 72.

Thus, in the present embodiment, the pressure acts on each rotor blade 70 or each stator vane 72 in a time sequence along the length thereof, or a part of each rotor blade 70 or each stator vane 72 that moves along the length thereof with time. As a result, the excitation force caused by such pressure is prevented from developing definite vibration modes in the rotor blade 70 or the stator vane 72.

The circumferential inclination of each stator vane 72 with respect to the corresponding radial line R is not limited to the $1/1$ inclination. As shown in FIG. 5, each stator vane 72 may be inclined in such a manner that the outer end 72B of the stator vane 72 is offset relative to the inner end 72A of the stator vane 72 by one half or more of the pitch or the interval of the stator vanes 72, for example. The circumferential inclination of each stator vane 72 with respect to the corresponding radial line R may also be in the opposite direction or directed in the direction opposite to the rotational direction of the rotor blades 70 as represented by the case of the −½ inclination and other inclinations shown in FIG. 5.

The greater the circumferential inclination of each stator vane 72 with respect to the corresponding radial line R is, or in other words, the greater the offset of the outer end of each stator vane 72 relative to the inner end of the stator vane 72 is, the longer in time the pressure distribution takes to move along the length of the stator vane 72. This means that the greater the circumferential inclination of each stator vane 72 with respect to the corresponding radial line R is, the more effectively the excitation of vibration modes, in particular low-order vibrations modes, is prevented from developing.

Figure 7:
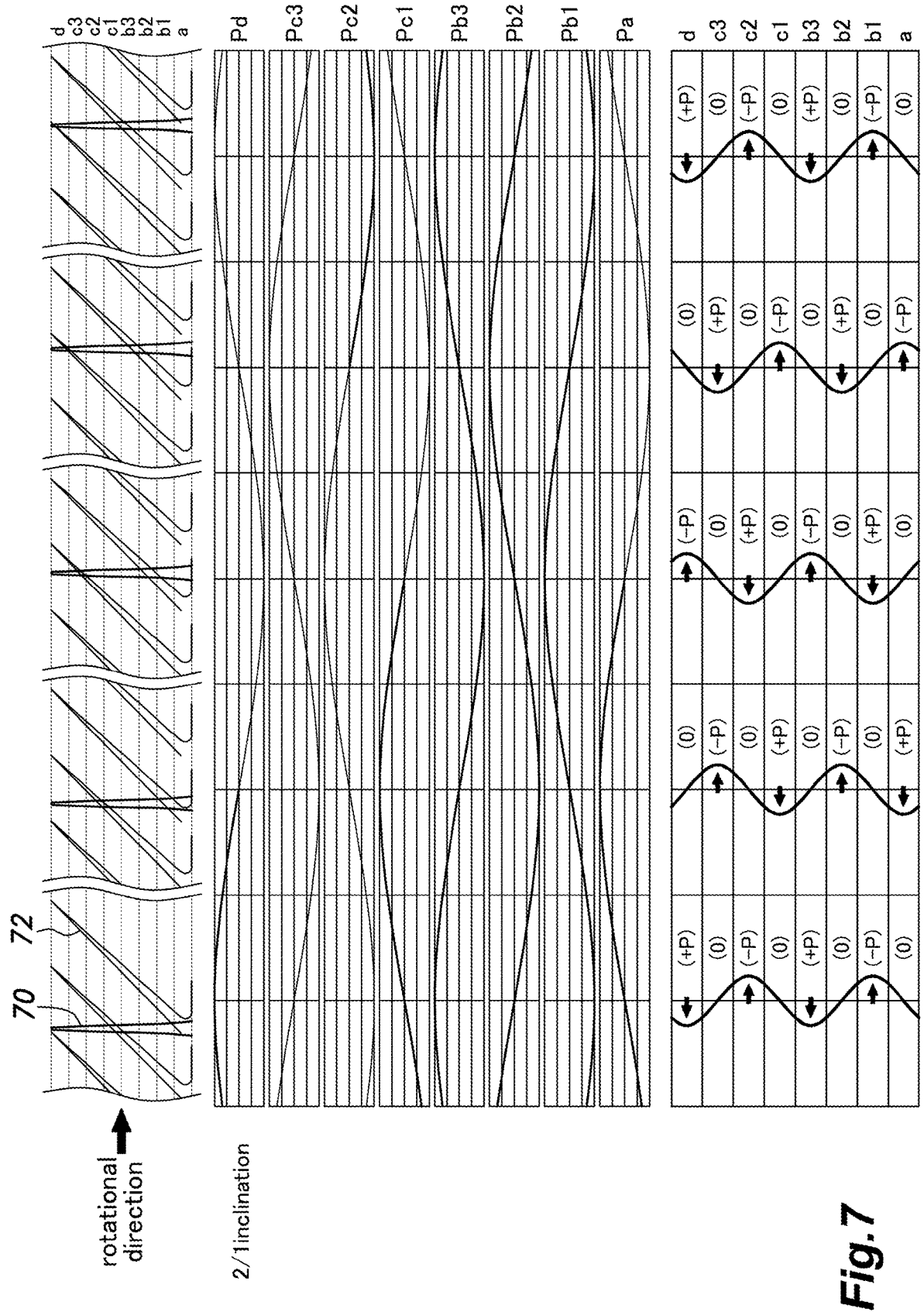
FIG. 7 is a graph showing a pressure property of an axial compressor according to an alternate embodiment of the present invention.

FIG. 7 shows the pressure fluctuation when the circumferential inclination of each stator vane 72 with respect to the corresponding radial line R is ⅔ inclination. In the case of the ⅔ inclination, as shown in FIG. 7, the distribution of pressure acting on each stator vane 72 is more widely spread out or averaged out so that the net excitation force acting on the stator vane 72 is substantially reduced, as compared to the case of the ⅓ inclination shown in FIG. 6B.

In either case, as long as the stator vanes 72 are inclined in the circumferential direction with respect to the corresponding radial lines R, the time duration of an overlap between each rotor blade 70 and any particular one of the stator vanes 72 as viewed in the axial direction increases so that the point at which the pressure is applied moves along the length of each rotor blade 70 or each stator vane 72 with time.

Although the present invention has been described with in terms of preferred embodiments thereof, the present invention is not limited by such embodiments, but can be appropriately modified without departing from the spirit of the present invention. For example, when the compressor is provided with a plurality of rows of rotor blades 70, the pitch angles θr of the rotor blades 70 may differ between those in the front row and the rear row. The phase relationship between the rotor blades 70 of the front row and the rotor blades 70 of the rear row may be different from each other, and the number of the rotor blades 70 in the front row may be different from that of the rear row. Similarly, when the compressor is provided with a plurality of rows of stator vanes 72, the pitch angles θs of the stator vanes 72 may differ between those in the front row and the rear row. The phase relationship between the stator vanes 72 of the front row and the stator vanes 72 of the rear row may be different from each other, and the number of the stator vanes 72 in the front row may be different from that of the rear row. Also, the pitch angles θr and θs of the rotor blades 70 and the adjoining stator vanes 72 may not be the same, and the numbers of the rotor blades 70 and the adjoining stator vanes 72 may also not be the same.

The invention claimed is:

1. An axial compressor, comprising;
    a casing;
    a rotational shaft rotatably provided in the casing;
    a row of rotor blades provided on the rotational shaft around a central axial line of the rotational shaft at a prescribed pitch; and
    a row of stator vanes provided on the casing around the central axial line at a prescribed pitch so as to adjoin the row of rotor blades on an upstream or downstream side thereof,
    wherein the rotor blades each extend along a radial line emanating from the central axial line, and the stator vanes each extend along a slanted line that is inclined with respect to a corresponding radial line in a circumferential direction in such a manner that a radially outer end of each stator vane is circumferentially offset from a radially inner end thereof by the pitch of the stator vanes.

2. The axial compressor according to claim 1, wherein a plurality of rows of stator vanes and a plurality of rows of rotor blades are alternately provided in an axial direction.

* * * * *